US005593173A

United States Patent [19]

Williamson

[11] Patent Number: 5,593,173

[45] Date of Patent: Jan. 14, 1997

[54] VERTICAL FOLDING WHEELCHAIR FRAME

[75] Inventor: Daniel E. Williamson, Clovis, Calif.

[73] Assignee: Quickie Designs Inc., Fresno, Calif.

[21] Appl. No.: 336,297

[22] Filed: Nov. 8, 1994

[51] Int. Cl.[6] .......... B62B 7/10

[52] U.S. Cl. .......... 280/642; 280/650; 280/250.1

[58] Field of Search .......... 280/642, 650, 280/650.1, 287, 658; 297/162

[56] References Cited

U.S. PATENT DOCUMENTS

| | | |
|---|---|---|
| 3,550,998 | 12/1970 | Boudreau et al. . |
| 4,025,088 | 5/1977 | Rothschild . |
| 4,100,143 | 7/1978 | Sieber . |
| 4,273,350 | 6/1981 | Williams . |
| 4,362,315 | 12/1982 | Kassai . |
| 4,371,183 | 2/1983 | Dion . |
| 4,639,012 | 1/1987 | Jensen . |
| 4,679,816 | 7/1987 | Riikonen . |
| 4,736,960 | 4/1988 | Batty et al. . |
| 4,768,797 | 9/1988 | Friedrich . |
| 4,840,390 | 6/1989 | Lockard et al. . |
| 4,887,826 | 12/1989 | Kantner . |
| 5,154,438 | 10/1992 | Barclay . |
| 5,328,183 | 7/1994 | Counts . |
| 5,421,603 | 6/1995 | Wills et al. .......... 280/658 |

*Primary Examiner*—Brian L. Johnson
*Attorney, Agent, or Firm*—Flehr, Hohbach, Test, Albritton & Herbert

[57] ABSTRACT

A vertical foldable wheelchair (10) having a pair of side frame assemblies (11, 11') each including frame members coupled together for selective movement of the side frame assemblies (11, 11') between a vertically extended deployed condition and a relatively vertically compact collapsed condition. The frame members are coupled together to provide a bi-stable, over-center, linkage assembly (13, 13') which is movable between and biased toward both of: (i) a first stable position on one side of a linkage assembly centerline when the side frame assemblies (11, 11') are in the deployed condition; and (ii) a second stable position on an opposite side of the centerline when the side frame assemblies (11, 11') are in the collapsed condition.

29 Claims, 7 Drawing Sheets

VERTICAL FOLDING WHEELCHAIR FRAME

TECHNICAL FIELD

The present invention relates generally to folding frame wheelchair apparatus, and more particularly to vertical folding frames for lightweight wheelchairs.

BACKGROUND ART

Portable wheelchairs are becoming an increasingly popular alternative over the standard rigid models for wheelchair riders. The portable wheelchairs generally have a frame which folds or collapses for easy transportation, enabling a user to conveniently travel between various locations, such as from home to work, school, restaurants, the theater or any other site of interest. Typically, the portable wheelchairs are light in weight for improved maneuverability and handling. The frame is often formed from a tubular material, such as a lightweight, high-strength aircraft-grade aluminum tubing, to reduce the overall chair weight while providing the necessary strength. In efforts to further reduce the weight of the chair, the number of components comprising the chair frame has also been reduced.

Traditionally, the folding wheelchair assemblies available in the art are "side-folding" wheelchairs which typically include two opposed side frame assemblies having upper and lower horizontally extending bars and a pair of cross braces pivoted for movement about the lower frame bars. The opposite ends of each of the cross braces are pivotally mounted to a horizontally extending seat frame rod. A flexible seat is suspended between the laterally spaced seat frame rods. When the wheelchair is deployed, the seat frame is supported on brackets carried by the upper bars of the opposed side frames. The seat frame is held by the brackets in a superimposed position above the side frame assemblies. The wheelchair frame is folded or collapsed for transport by pivoting the cross braces about the respective side frame bars, raising the seat frame and drawing the opposed side frame assemblies towards one another. Typical of patented prior art side-folding wheelchair apparatus are the wheelchairs disclosed in U.S. Pat. Nos.: 4,025,088; 4,101,143; 4,273,350; 4,371,183; 4,768,797; 4,840,390; 5,154,438; and 5,328,183.

While these scissor-like folding frames are capable of folding to a reduced dimension, they are still quite large, even in the folded state. Often the wheels and wheel hubs extend outwardly of the side frames which adds to the overall width. This is particularly true if the wheels are to remain mounted to the frame when collapsed. Further, since the seat must collapse upwardly or downwardly, the backrest frame and/or the foot rest frame are prevented from folding inwardly toward the seat without requiring a complex assembly of interengaging linkages.

Another problem associated with these side folding wheelchairs is that frames generally lack torsional rigidity since the torsional loads are focused through the hinge joints rather than through other rigid or locked members. Hence, stability is affected which limits its use. Moreover, this design makes the use of a rigid seat member and rigid backrest member more difficult since they must either be hinged or removed from the frame to enable collapsing of the frame.

These problems have partially been overcome through the design of vertical folding wheelchair frames whereby the backrest frame generally folds atop and parallel to the seat assembly, while the footrest assembly folds underneath and parallel to the seat assembly. These wheelchair designs provide increased torsional rigidity and stability similar to a non-folding wheelchair, while further optionally allowing the use of a more rigid backrest member and rigid seat member. Typical of these patented vertical folding frame wheelchairs are disclosed in U.S. Pat. Nos. 4,679,816; 4,736,960; and 4,887,826.

One significant problem associated with these designs, however, is that the linkage assemblies allow the frames to be moved inadvertently between the fully collapsed or retracted position (i.e., for storage or transportation), and the fully deployed or extended position (i.e., for use). Typically, these assemblies include some type of locking mechanism, such as locking sleeves, locking pins, or the like, to lock the linkages in the deployed position to prevent collapse. This problems may be quite serious if the unfolded frames are unintentionally not locked together when the wheelchair is in use. In this situation, the weight of the wheelchair occupant, and/or the forces exerted on the frame and linkages during normal use may cause the unfolded linkages to collapse to the folded position, potentially injuring the occupant.

DISCLOSURE OF THE INVENTION

Accordingly, it is an object of the present invention to provide a vertically foldable frame for a wheelchair which is structurally stable and will not inadvertently collapse when the wheelchair frame is deployed.

A further object of the present invention is to provide a vertically foldable frame for a wheelchair which is more torsionally rigid than a side-folding frame wheelchair.

Another object of the present invention is to provide a vertically foldable frame for a wheelchair which is relatively compact when the wheelchair frame is folded or collapsed.

Yet another object of the present invention is to provide a vertically foldable frame for a wheelchair which provides the stability of a rigid wheelchair frame.

An additional object of the present invention is to provide a vertically foldable frame for a wheelchair which is lightweight.

A more general object of the present invention to provide a vertically foldable frame for a wheelchair which is durable, compact, easy to maintain, has a minimum number of components, is easy to use by unskilled personnel, and is economical to manufacture.

The vertical foldable wheelchair of the present invention includes a pair of side frame assemblies connected together as a unit by at least one cross-frame member. The side frame assemblies each include frame members coupled together for selective movement of the side frame assemblies between a vertically extended deployed condition and a relatively vertically compact collapsed condition. At least one of the side frame assemblies includes frame members coupled together to provide a bi-stable, over-center, linkage assembly. The linkage assembly is movable between and biased toward both of: (i) a first stable position on one side of a linkage assembly centerline when the side frame assemblies are in the deployed condition; and (ii) a second stable position on an opposite side of the centerline when the side frame assemblies are in the collapsed condition.

Briefly, the linkage assembly generally includes a four-bar linkage assembly having an upper frame member, and a front frame member. The front frame member has an upper end pivotally coupled proximate a front end of the upper frame member and depends downwardly therefrom. Further, the linkage assembly includes a bottom frame member having a longitudinal axis thereof, and a forward end pivotally coupled to the front frame member at a position therealong and spaced-apart from the front frame upper end thereof. An L-shaped hinge bracket includes one end pivotally mounted to a rear end of the upper frame member, and an opposite end thereof pivotally coupled proximate a rearward end of the bottom frame member. The hinge bracket extends along a longitudinal axis spaced-apart from the pivotal coupling at the one end, and extends in a direction substantially passing through the opposite end thereof such that passage across the linkage assembly centerline occurs between the deployed condition and the collapsed position when the hinge bracket longitudinal axis and the bottom frame longitudinal axis extend in substantially the same direction.

Once the linkage assembly has moved passed the central position or the centerline, a spring augmented device or the resiliency of the linkage assembly urges the side frame assemblies toward the deployed condition or the collapsed condition (depending upon which side of the centerline the linkage assembly resides).

BEST MODE OF CARRYING OUT THE INVENTION

Figure 1:
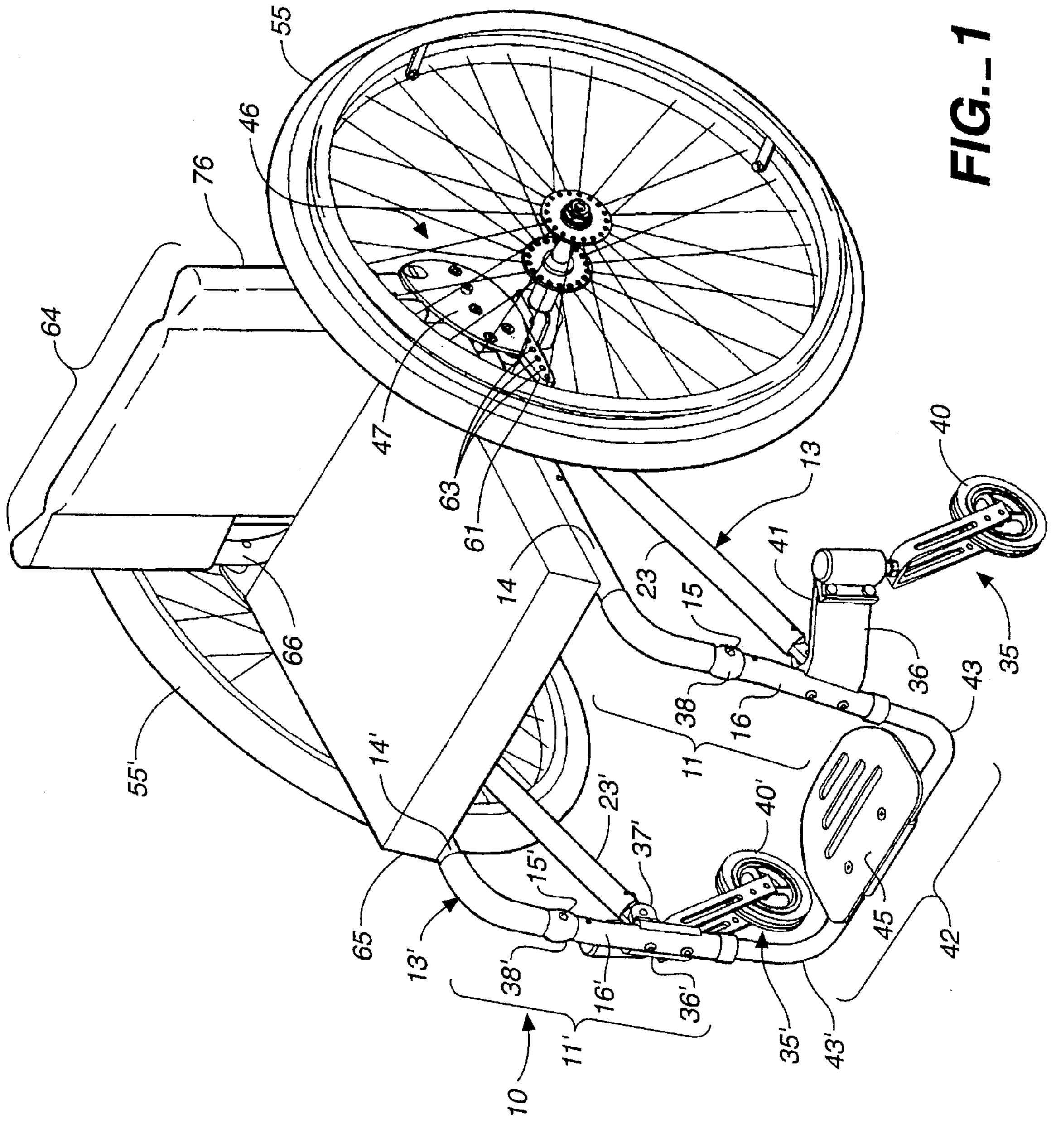
FIG. 1 is a top perspective view of a vertical folding frame wheelchair constructed in accordance with the present invention.

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Figure 2A:
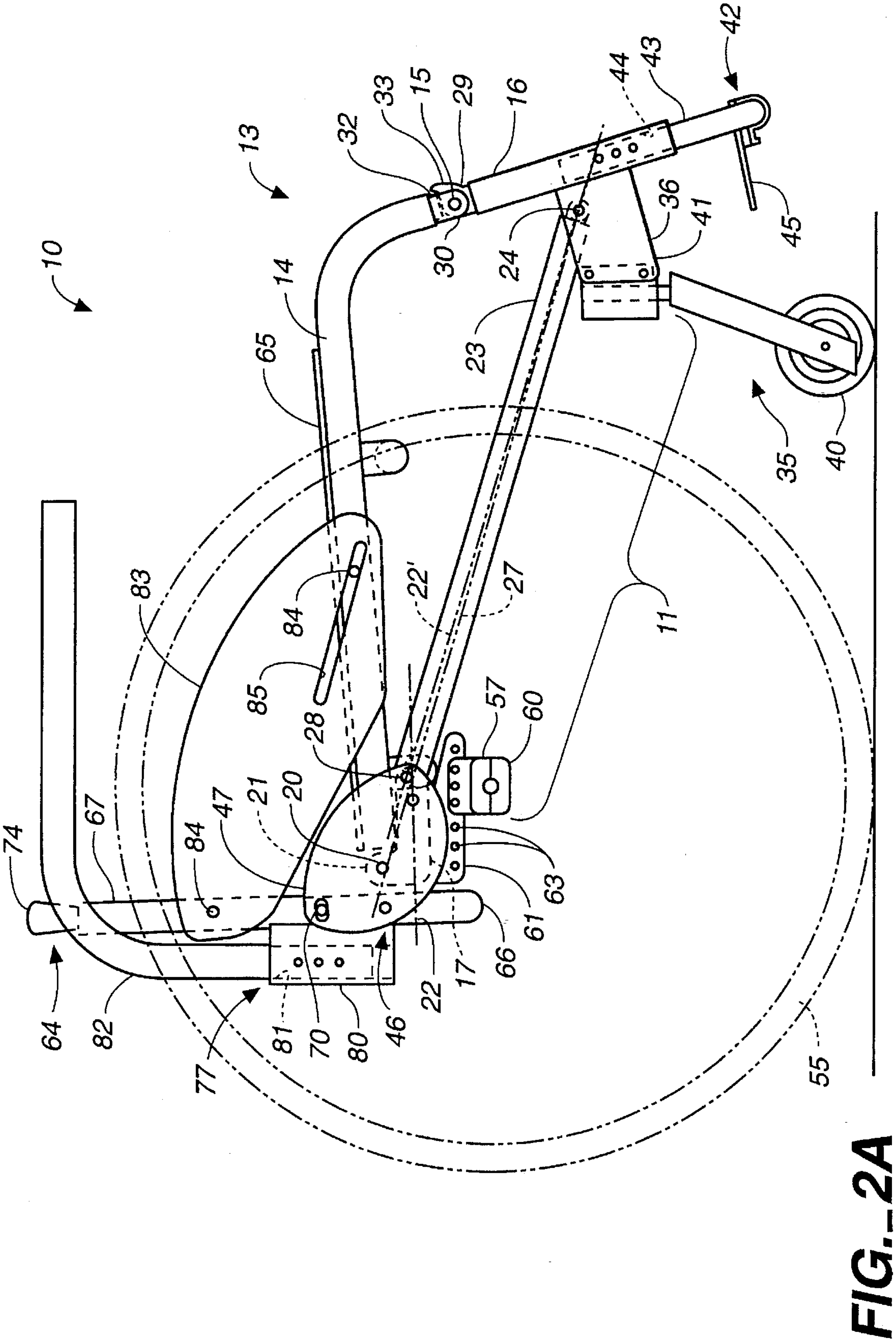
FIGS. 2A–2C are a series of side elevation views of the vertical folding frame wheelchair of FIG. 1 illustrating movement of the frame between the deployed condition to the collapsed condition.
Figure 2B:
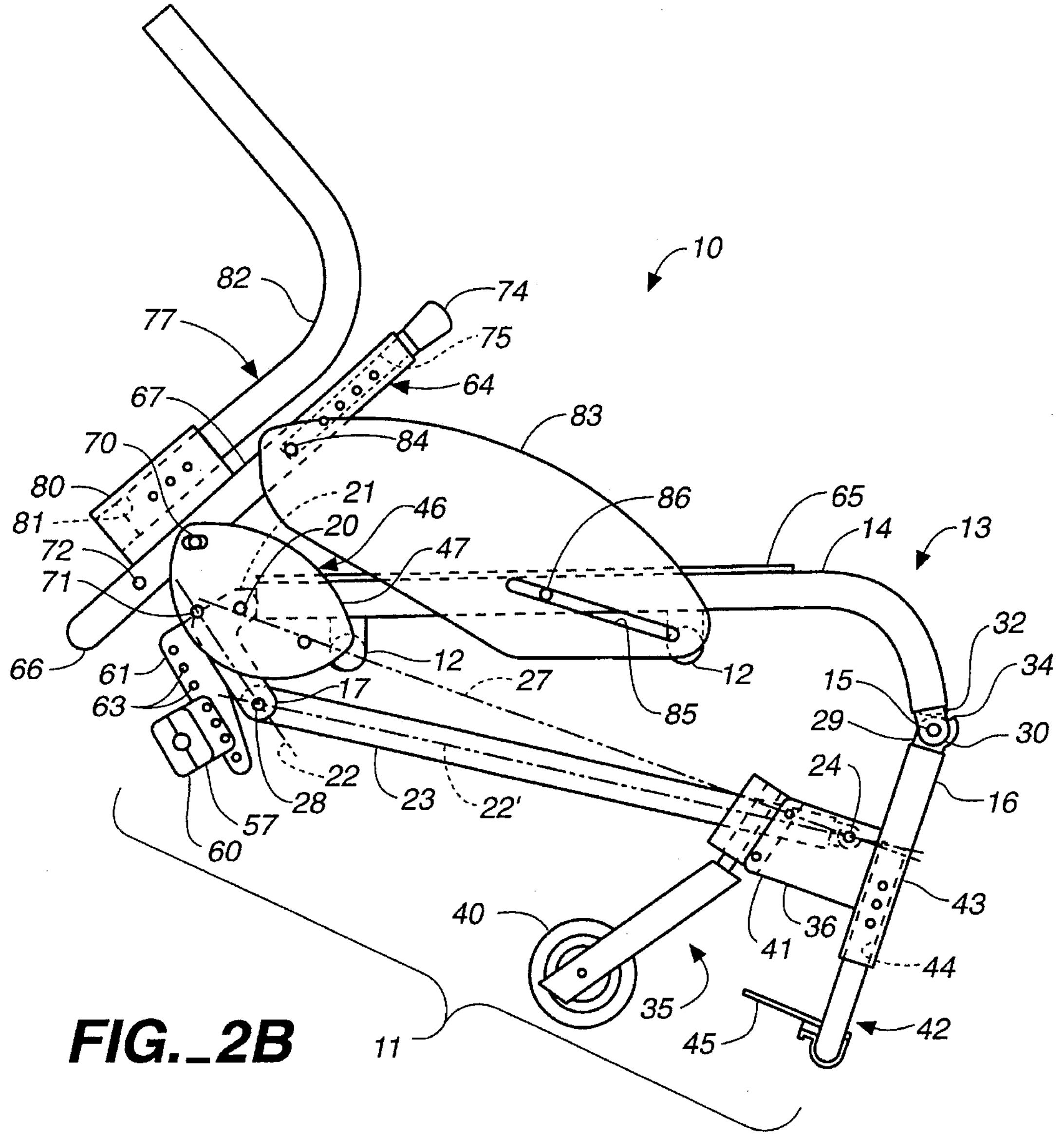
Figure 2C:
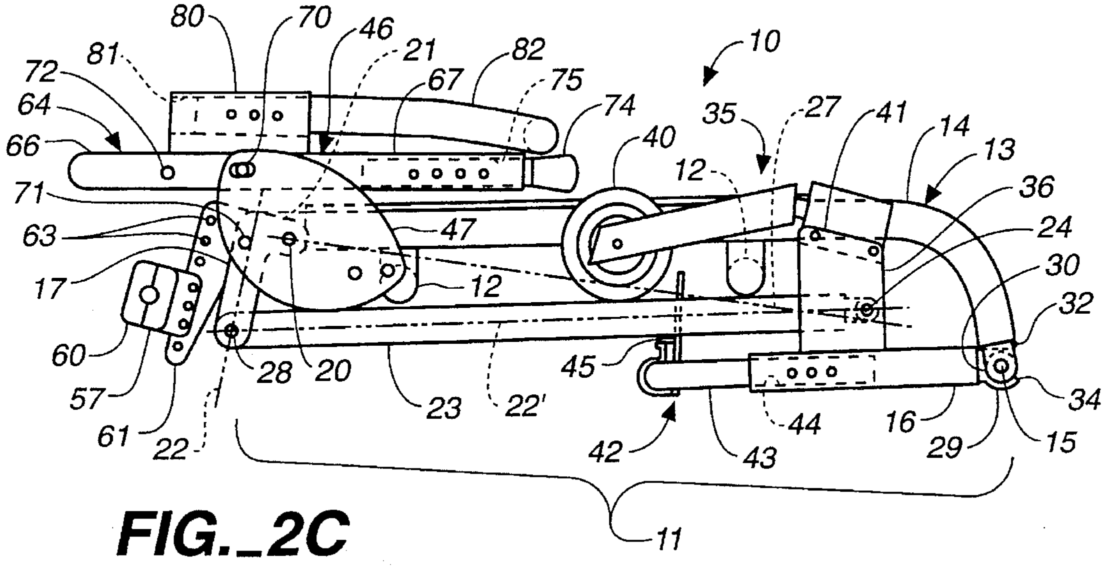
Figure 3:
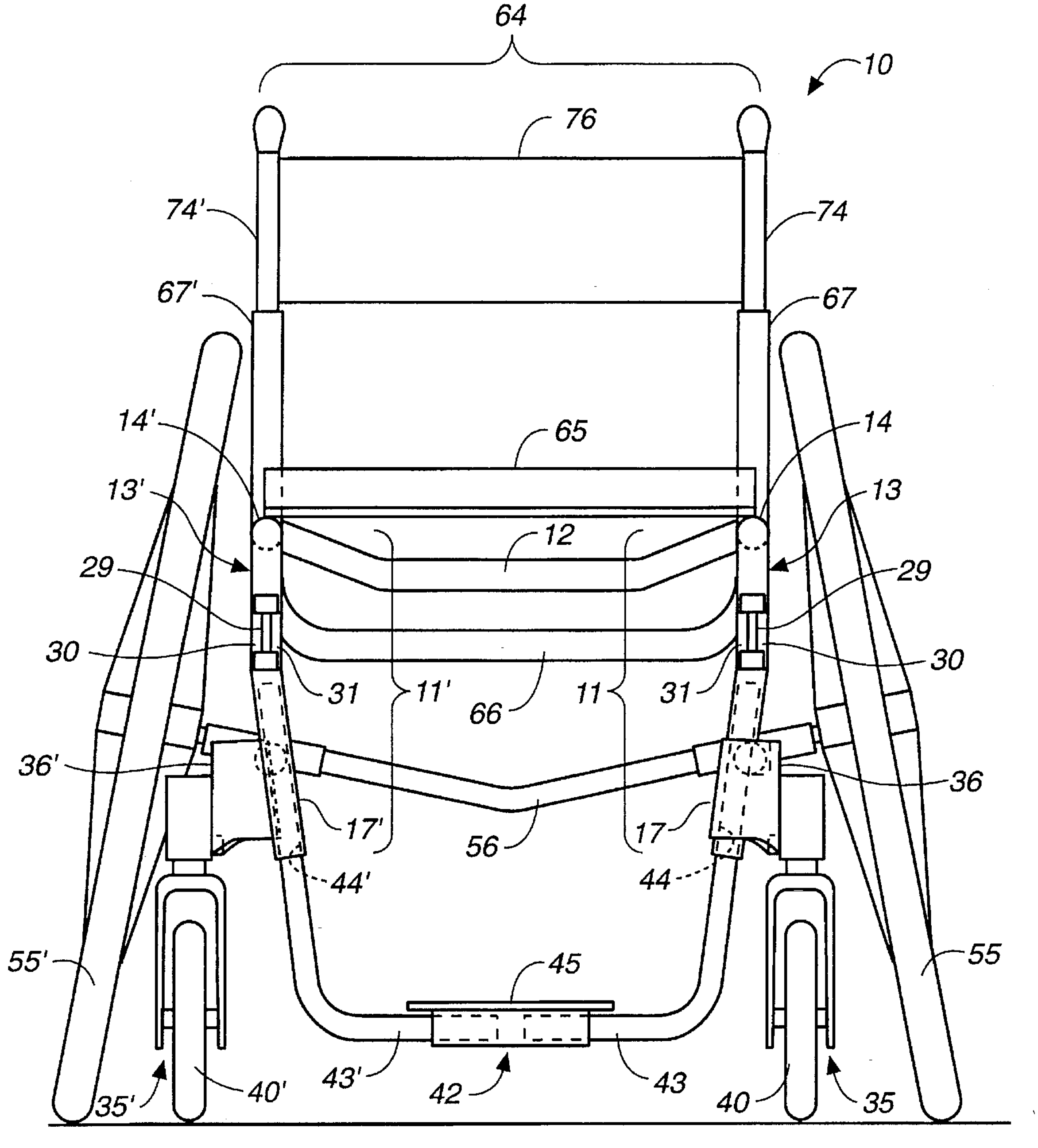
FIG. 3 is a front elevation view of the vertical foldable frame of FIG. 2, shown in the deployed position.
Figure 4:
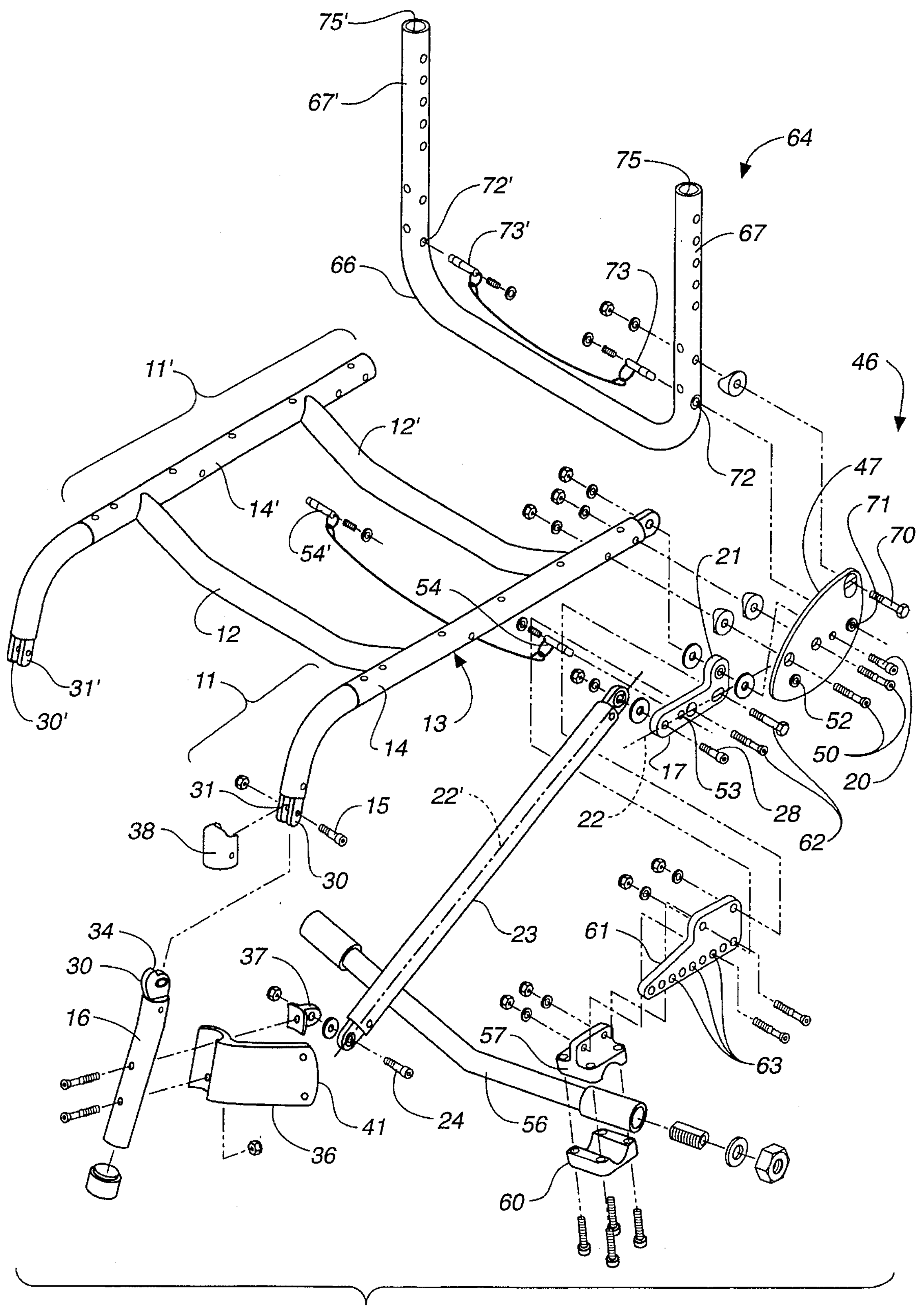
FIG. 4 is an enlarged, exploded, perspective view of the vertical foldable frame of the wheelchair of FIG. 1.

Attention is now directed to FIGS. 1, 2A–2C, 3 and 4, where the subject vertical foldable wheelchair apparatus, generally designated 10, is illustrated including a pair of side frame assemblies 11, 11' connected together as a unit by two cross-frame members 12, 12' (FIG. 4). Briefly, side frame assemblies 11, 11' each include frame members coupled together for selective movement of the side frame assemblies between a vertically extended deployed condition (FIGS. 1, 2A and 3) and a relatively vertically compact folded or collapsed condition (FIG. 2C). At least one of the side frame assemblies 11, 11' (although preferably both) includes frame members coupled together to provide a bi-stable, over-center, linkage assembly, generally designated 13, 13'. Each linkage assembly 13, 13' is movable between and biased toward both of: (i) a first stable position (FIGS. 1, 2A, 3 and 5A) on one side of a linkage assembly centerline 27 (FIGS. 5A and 5B) when side frame assemblies 11, 11' are in the deployed condition; and (ii) a second stable position (FIG. 2C) on an opposite side of centerline 27 when the side frame assemblies are in the collapsed condition.

In accordance with the present invention, the wheelchair apparatus 10 provides a vertically foldable or collapsible wheelchair frame which is more torsionally rigid than the side-folding frame wheelchairs of the prior art. The wheelchair frame is capable of collapsing to a relatively small package with is easily transported and stored. More importantly, the foldable wheelchair frame of the present invention provides a bi-stable, over-center linkage assembly which is biased toward either the deployed condition or the collapsed condition. Hence, storage or operational stability in either the collapsed condition or the deployed condition, respectively, can be more easily maintained until the occupant selectively manually manipulates the folding frame. Once past the centerline in the first stable and fully deployed position, the linkage assembly is sufficient resilient to maintain the frame members in the deployed condition. This increases the operational safety of the wheelchair for the wheelchair occupant.

Turning now to FIG. 4, the components of the side frame assemblies of the present invention will be described in detail. Each side frame assembly 11, 11' is preferably an identical mirror-image four-bar linkage assembly formed for pivotal movement relative the individual frame members thereof. Hence, for the ease of description, only one side frame assembly will be described in detail.

Briefly, linkage assembly 13 of side frame assembly 11 includes a generally horizontal upper frame member 14 having a downwardly depending front end and an opposite extending rear end thereof. Pivotally mounted to the front distal end of upper frame member 14, through a knee joint bolt 15, is a tubular front frame member 16. The linkage assembly further includes an L-shaped hinge bracket, generally designated 17, having an upper ear or lobe portion 21 pivotally mounted to the rear end of upper frame member 14 through bolt 20. Hence, bracket member 17 can be seen to have a longitudinal axis 22 (FIG. 5A) extending through pivot bolt 28 and substantially parallel to frame member 14 and spaced-apart or offset about the pivotal axis of bolt 20.

FIG. 4 further illustrates that the linkage assembly includes a bottom frame member 23 having a central longitudinal axis 22' and a forward end pivotally coupled, through bolt 24, to front frame member 16 at a central portion thereof. To complete the four-bar linkage assembly, a rearward end of bottom frame member 23 is pivotally coupled to hinge bracket 17 at an opposite end thereof through bolt 28. It will be appreciated that the pivotal coupling enabled by the pivot bolts of the linkage assembly may be provided by any other conventional pivotal or angularly displaceable mounts.

Figure 5A:
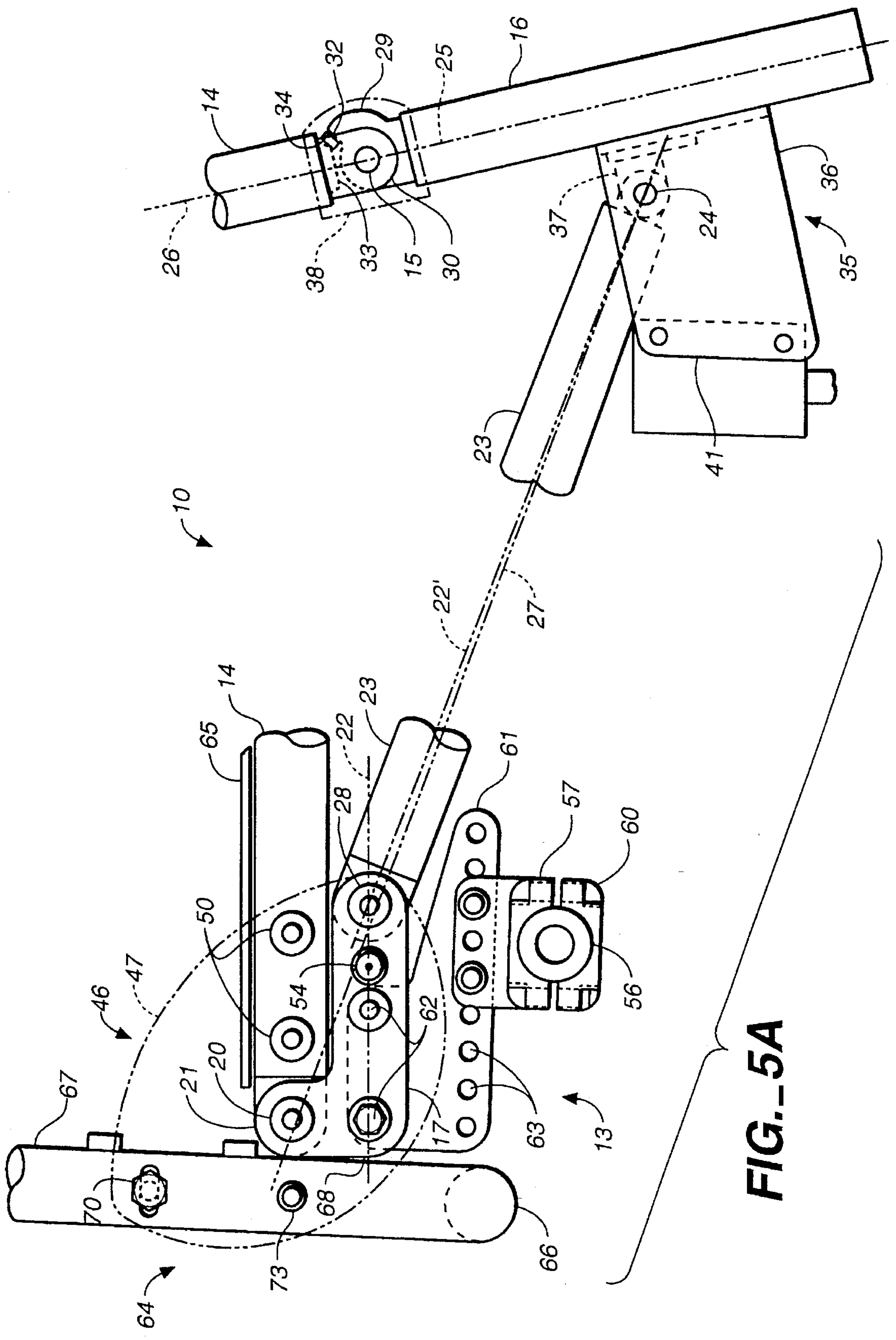
FIGS. 5A and 5B are enlarged, fragmentary, side elevation views of the bi-stable, over-center, linkage assembly of the present invention and the resilient stop member.

In accordance with the present invention, this novel configuration of the frame members cooperate to urge the linkage assembly toward the first stable position or the second stable position, depending upon which side of the linkage assembly centerline 27 (i.e., where pivotal bolt 28 intersects linkage assembly centerline 27 (not shown)) hinge bracket longitudinal axis 22 and bottom frame member longitudinal axis 22' reside. In the first stable position, as shown in FIG. 5A, longitudinal bracket axis 22 and longitudinal frame member axis 22' are above centerline 27. Weight on the wheelchair frame keeps them in this position and retains the side frame assembly in the deployed condition. The L-shaped hinge bracket 17 ensures that an angle between centerlines 22 and 22' is maintained so that bumps and unweighting during wheelchair operation will not cause the centerlines 22 and 22' to cross over centerline 27 (i.e., when the pivotal intersection at bolt 28 crosses over linkage assembly centerline 27).

In order to facilitate axes movement 22 and 22' over centerline 27, the present frame assembly includes a resilient stop assembly. As best may be seen in FIG. 5A, in the deployed condition at the first stable position, the longitudinal axis 25 of front frame member 16 is co-axially aligned with or situated in substantially the same direction as the longitudinal axis 26 of the downwardly depending portion of upper frame member 14. In contrast, when the linkage assembly is moved to the linkage centerline (not shown), the axes 22 and 22' of hinge bracket 17 and bottom frame member 23 begin to straighten out which causes the front frame member to pivotally over-extend about knee joint bolt 15. This skewed orientation of front frame member 16 relative the downwardly depending portion of upper frame member 14, shown more exaggerated in FIG. 5B where axes 22 and 22' are co-axially aligned, provides the necessary resiliency between the frame members (as will be discussed below) to positively urge the linkage assembly away from the centerline position toward either the first stable position (FIG. 5A) or the second stable position (FIG. 2B).

In the preferred form, the upper distal end of the front frame member 16 includes a hinge plate 29 formed to pivotally cooperate with a pair of straddling flange members 30, 31 extending from the front end of upper frame member 14. Hinge plate 29 is pivotally mounted to each flange member 31, 31' through knee joint bolt 15 for pivotal movement about a generally horizontal axis.

Figure 5B:
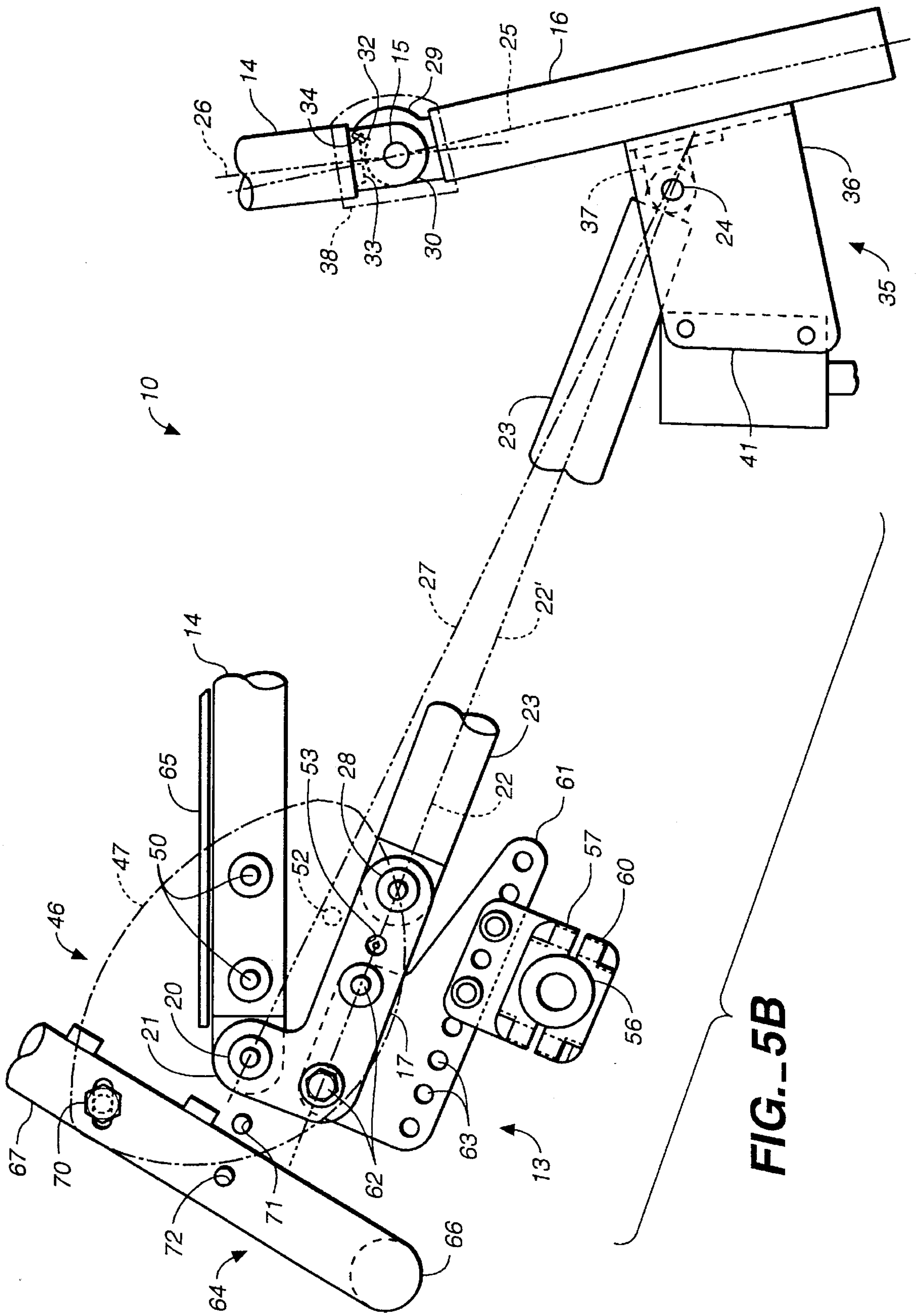

Situated between flange members 30, 31 is a resilient stop member 32 which is mounted to a ledge portion 33 at front end of upper member 14 between flanges 30, 31. FIGS. 5A and 5B illustrate that hinge plate 29 includes an upward facing shoulder 34 oriented to contact stop member 32 upon movement of the linkage assembly toward the centerline position.

When linkage assembly 13 is moved until the intersection of the axes 22 and 22' at pivotal bolt 28 align at linkage assembly centerline 27 (not shown), front frame member 16 is pivoted about knee joint bolt 15 in a manner pushing a bottom end of the front frame member outwardly or forwardly. Consequently, resilient stop 32 is compressed through contact with shoulder 34 of hinge plate 29 by an amount sufficient to cause a resilient reaction force urging the linkage assembly away from the centerline position. As the longitudinal axes 22 and 22' of hinge plate 17 and bottom frame member 23 pass slightly beyond centerline 27, in an upward direction stop member 32 pushes against the hinge plate shoulder 34 to bias linkage assembly 13 toward the deployed condition (FIGS. 2A, 3 and 5A). Conversely, when the longitudinal axes 22 and 22' of the hinge plate and the bottom frame member pass slightly below the centerline position (FIG. 5B), stop member 32 pushes against the hinge plate shoulder to urge the linkage assembly toward the second stable position, the collapsed condition (FIGS. 2B and 2C).

In the deployed condition, stop member 32 preferably is still slightly compressed between the hinge plate should 34 and ledge portion 33 so that the linkage assembly remains positively biased away from the linkage assembly centerline. This further facilitates retainment of the side frame assembly in the deployed condition against bumps and chair unweighting during operation.

Stop member 32 is preferably composed of rubber, plastic or other resilient polymers. A flexible knee cap member 38 (shown in FIG. 4 and shown in phantom lines in FIGS. 5A and 5B) is preferably included to shield the wheelchair occupant from potential injury due to the interengaging parts and to keep debris from entering the knee assembly. Further, it will be appreciated that the resiliency between the frame members may be generated through spring augmentation or the like (e.g., torsional springs) without departing from the true spirit and nature of the present invention.

In the preferred embodiment, front frame member 16 includes a caster wheel assembly 35 having a caster bracket 36 rigidly mounted to the central portion thereof. FIG. 4 indicates that a caster hinge 37 of caster wheel assembly 35 pivotally connects to the forward end of bottom frame member 23 for pivotal coupling to the front frame member. A pivotal caster wheel 40 is mounted to an ear portion 41 of caster bracket 36 to provide rolling support to the front portion of wheelchair apparatus 10. The caster bracket ear portion 41 extends outwardly of front frame member 16 and bottom frame member 23 (FIGS. 3 and 4) so as not to interfere with the movement of side frame assembly 11 between the deployed condition and the collapsed position.

Telescopically mounted to a lower distal end portion of front frame member 16 is a footrest assembly 42 providing support for the wheelchair occupant's feet. As shown in FIGS. 1, 2 and 3, footrest assembly 42 includes an L-shaped footrest tube 43 having one end telescopically received in a bore 44 at the lower distal end of front frame member 16. Hence, footrest tube 43 may be length adjusted relative front frame member 16 for custom applications.

Footrest assembly 42 further includes a footrest plate member 45 movably mounted between the opposing footrest tubes 43, 43', and formed to support the wheelchair occupant's feet thereon (FIGS. 1–3).

In the preferred embodiment, a locking mechanism 46 may also be included to releasably retain the linkage assembly in the deployed condition. Locking mechanism 46 preferably includes an elliptical-shaped side plate 47 rigidly mounted to upper frame member 14 through bolts 50 at the rear end thereof, and pivotally mounted to hinge bracket 17 through bolt 20. Accordingly, upon movement of the linkage assembly to the deployed condition, hinge bracket 17 is releasably locked to side plate 47, and hence, to upper frame member 14.

As best viewed in FIG. 5B, locking mechanism 46 includes a hinge pin aperture 52 strategically positioned in side plate 47 to co-axially align with a hinge pin hole 53 extending through hinge bracket 17. Both the hinge pin aperture and hole are formed and dimensioned for sliding receipt of a hinge pin 54 (FIGS. 4 and 5A), when alignment occurs in the deployed condition, to releasably lock hinge bracket 17 relative upper frame member 14. Accordingly, this causes the linkage assembly to be retained in the deployed condition until hinge pin 54 is manually removed.

The wheelchair apparatus of the present invention further includes a pair of rear manual drive wheels 55, 55' rotatably mounted to a respective side frame assembly 11, 11'. Each drive wheel is rotatably supported to and removably mounted on a V-shaped axle 56 coupled to the respective side frame assemblies 11, 11'. A pair of axle clamps 57, 60 grip one side of axle 56 therebetween so that the axle can be to removably mounted to an axle adjustment plate 61. In turn, axle adjustment plate 61 is coupled to a respective hinge bracket 17 through retaining bolts 62. Accordingly, upon collapse of the side frame assemblies 11, 11' from the deployed to the collapsed condition (FIGS. 2B and 2C), V-shaped axle is angularly displaced together with hinge brackets 17, 17'.

FIGS. 4 and 5 illustrate that adjustment plate 61 provides a plurality of spaced-apart mounting apertures 63 extending longitudinally therealong for adjustable positioning of axle clamps 57, 60'. The manual drive wheels 55, 55' hence can a situated further forward and rearward, via V-shaped axle 56, for custom positioning.

A backrest assembly 64 is included pivotally mounted to side frame assemblies 11, 11' for movement between an unfolded position (FIGS. 1, 2A and 3) and a folded position (FIG. 2C), generally oriented parallel to and atop a seat member or pad 65. Backrest assembly 64 preferably includes a U-shaped backrest frame 66, having opposing back post portions 67, 67' which are pivotally mounted between side plates 47, 47' through a pair of pivot bolts 70.

Similar to locking mechanism 46, side plate 47 includes a backrest pin aperture 71 strategically positioned in side plate 47 to co-axially align with a backrest pin hole 72 (FIG. 5B) extending through back post portion 67, in the deployed condition. Both the backrest pin aperture and hole are formed and dimensioned for sliding receipt of a backrest pin 73, as shown in FIG. 4, in the deployed condition, to releasably retain backrest frame 66 relative side plate 47, and thus, side frame assembly 11. Accordingly, while side frame assembly 11 is retained in the deployed condition, backrest assembly 64 can be stably retained in the unfolded position until backrest pin 73 is manually removed.

When backrest frame 66 is locked to side plate 47, via backrest pin 73, the backrest assembly 64 acts as a second fail safe system to stablize side frame assembly 11 in the event locking mechanism 46 should fail. As shown in FIG. 5A, since hinge bracket 17 pivotally displaces about bolt 20 in generally the same plane passing through back post portion 67 of backrest frame 66, a back wall 68 of hinge bracket 17 will engage against back post portion 67 to prevent movement of the linkage assembly 13 to the collapsed condition.

Backrest assembly 64 may further include a pair of telescopic posts 74, 74' formed for sliding receipt in receiving bores 75 provided at the upper distal ends of back post portions 67, 67'. Accordingly, the height of the telescopic posts, which support a backrest pad 76 (FIG. 1), can be manually adjusted.

Further, backrest assembly 64 may include an armrest assembly 77 (FIGS. 2A–2C) mounted to the U-shaped backrest frame 66. The backrest assembly includes a pair of mounting bases 80 (only one shown) coupled to a rear facing surface of back post portion 67.

Mounting base 80 provides a receptacle 81 at an upper surface thereof formed for pivotal and sliding receipt of an armrest tube 82 therein.

Upon movement of the backrest assembly from the unfolded position to the folded position, armrest tube 82 can be pivotally moved in receptacle 81 until it lays atop the backrest frame 66 for compact storage and transportation. A simple pin member (not shown) may be included to retain the height and positioning of the armrest tube relative the mounting base.

Finally, each side frame assembly 11, 11' of the present invention preferably includes a folding sideguard 83 (only one shown in FIGS. 2A and 2B) to facilitate shielding of the wheelchair occupant from manual drive wheels 55, 55'. Folding sideguard 83 is a plate-like member having one end pivotally mounted to the backrest frame back post portion 67 about a generally horizontal axis through bolt or pin 84. An opposite end of sideguard 83 includes an elongated slot 85 formed for sliding receipt of a guiding pin 86 protruding radially outward from upper frame member 14. Hence, upon collapse of backrest frame from the unfolded position (FIG. 2A) toward the folded position (FIG. 2B), folding sideguard 83 pivots about bolt 84 while guiding pin 86 slides along slot 85 until the backrest frame is fully moved to the folded position.

What is claimed is:

1. A vertically foldable frame for a lightweight wheelchair comprising:

a pair of side frame assemblies connected together as a unit by at least one cross-frame member;

said side frame assemblies each having frame members coupled together for selective movement of said side frame assemblies between a vertically extended deployed condition and a relatively vertically compact collapsed condition;

at least one of said side frame assemblies having frame members pivotally coupled together to provide a bi-stable, over-center, linkage assembly movable between and biased toward both of:

(i) a first stable position on one side of a linkage assembly centerline when said side frame assemblies are in said deployed condition; and (ii) a second stable position on an opposite side of said centerline when said side frame assemblies are in said collapsed condition; and a biasing structure cooperating with said linkage assembly and being sufficiently resilient to retain said linkage assembly in said first stable position when said linkage assembly is positioned on the one side of the centerline, and biasing said linkage assembly toward said second stable positioned when positioned on the opposite side of the centerline.

2. The vertical foldable frame as defined in claim 1 wherein, both said side frame assemblies have frame members coupled to provide bi-stable, over-center linkage assemblies.

3. The vertical foldable frame as defined in claim 1 wherein, said biasing structure is provided by the resiliency of said frame members when positioned substantially proximate the centerline.

4. The vertical foldable frame as defined in claim 1 wherein, said linkage assembly is a four bar linkage assembly.

5. The vertical foldable frame as defined in claim 4 wherein, said four bar linkage assembly includes:

an upper frame member;

a front frame member having an upper end pivotally coupled proximate a front end of the upper frame member and depending downwardly therefrom;

a bottom frame member having a longitudinal axis, and a forward end pivotally coupled to said front frame member at a position therealong and spaced-apart from the front frame upper end thereof; and an L-shaped hinge bracket having one end pivotally mounted to a rear end of said upper frame member, and an opposite end thereof pivotally coupled proximate a rearward end of said bottom frame member, said hinge bracket extending along a longitudinal axis spaced-apart from the pivotal coupling at said one end, and extending in a direction substantially passing through said opposite end thereof such that said linkage assembly centerline occurs between said deployed condition and said collapsed position when the hinge bracket longitudinal axis and the bottom frame longitudinal axis extend in substantially the same direction.

6. The vertical foldable frame as defined in claim 5 wherein, said linkage assembly includes a linkage locking mechanism releasably locking said hinge bracket to said upper frame member when said frame members are situated in said deployed condition.

7. The vertical foldable frame as defined in claim 6 wherein, said locking mechanism includes a side plate member fixedly mounted to said upper frame member proximate said rear end thereof, and defining a hinge pin aperture positioned to co-axially align with a hinge pin hole in said hinge bracket when said frame members are situated in said deployed condition, said hinge pin aperture and said hinge pin hole formed for receipt of a hinge pin upon co-axial alignment therebetween.

8. The vertical foldable frame as defined in claim 5 wherein, said linkage assembly includes a stop member operably coupled between the pivotal coupling between said upper frame member and said front frame member to limit the pivotal movement therebetween in said deployed condition.

9. The vertical foldable frame as defined in claim 1 wherein, said side frame assemblies include back posts coupled thereto for movement between an unfolded position and a folded position.

10. The vertical foldable frame as defined in claim 1 wherein, said side frame assemblies include a front wheel caster bracket member coupled to collapse upon movement of said side frame assemblies between said deployed condition and said collapsed condition.

11. The vertical foldable frame as defined in claim 1 wherein, said side frame assemblies include a rear wheel frame mounting member coupled to collapse.

12. The vertical foldable frame as defined in claim 1 wherein, said biasing structure includes a resilient stop member cooperating with a pivotal coupling between said frame members of the one side frame assembly to limit the pivotal movement therebetween in the deployed condition, said resilient stop member further being sufficiently formed and dimensioned for compression between said frame members, when said linkage assembly is positioned substantially proximate said centerline, for biasing toward said first stable positioned when on the one side of the centerline, and toward said second stable positioned when said linkage assembly is positioned on the opposite side of the centerline.

13. The vertical foldable frame as defined in claim 3 wherein, said biasing structure further includes a resilient stop member cooperating with a pivotal coupling between said frame members of the one side frame assembly to limit the pivotal movement therebetween in the deployed condition, said resilient stop member further being sufficiently formed and dimensioned for compression between said frame members, when said linkage assembly is positioned substantially proximate said centerline, for biasing toward said first stable positioned when on the one side of the centerline, and toward said second stable positioned when said linkage assembly is positioned on the opposite side of the centerline.

14. A vertically foldable frame for a lightweight wheelchair comprising:

a pair of side frame assemblies connected together as a unit by at least one cross-frame member, each said side frame assemblies providing a bi-stable, over-center, four-bar linkage assembly including:

an upper frame member;

a front frame member having an upper end pivotally coupled proximate a front end of the upper frame member and depending downwardly therefrom;

a bottom frame member having forward end pivotally coupled to said front frame member at a position therealong and spaced-apart from the front frame upper end thereof; and an L-shaped hinge bracket having one end pivotally mounted to a rear end of said upper frame member, and an opposite end thereof pivotally coupled proximate a rearward end of said bottom frame member, each said linkage assembly movable between and biased toward both of:

(i) a first stable position on one side of a linkage assembly centerline when said side frame assemblies are in a vertically extended deployed condition; and (ii) a second stable position on an opposite side of said centerline when said side frame assemblies are in a relatively vertically compact collapsed condition.

15. The vertical foldable frame as defined in claim 14 wherein, each said linkage assembly includes a linkage locking mechanism releasably locking the respective hinge bracket to the respective upper frame member when said linkage assemblies members are situated in said deployed condition.

16. The vertical foldable frame as defined in claim 15 wherein, each said locking mechanism includes a side plate member fixedly mounted to the respective upper frame member proximate said rear end thereof, each said side plate defining a hinge pin aperture positioned to coaxially align with a respective hinge pin hole in the respective hinge bracket when said linkage assemblies are situated in said deployed condition, each said hinge pin aperture and said hinge pin hole formed for receipt of a hinge pin upon co-axial alignment therebetween.

17. The vertical foldable frame as defined in claim 16 wherein, each side frame assembly include a back post coupled to the respective side plate member for movement between an unfolded position and a folded position.

18. The vertical foldable frame as defined in claim 17 wherein, said backrest posts are pivotally mounted to said side plate member and are rigidly coupled one another together as a unit.

19. The vertical foldable frame as defined in claim 18 wherein, each said side frame assembly includes a side guard plate mounted between the respective backrest post and upper frame member for movement between an up position, when said sides assemblies are in said deployed position, and a down position, when said side frame assemblies are in said collapsed position.

20. The vertical foldable frame as defined in claim 18 wherein, each said side frame assembly includes an armrest post mounted to the respective backrest post.

21. The vertical foldable frame as defined in claim 14 wherein, each said linkage assembly includes a stop member operably coupled between the pivotal coupling between the respective upper frame member and front frame member to limit the pivotal movement therebetween in said deployed condition.

22. The vertical foldable frame as defined in claim 21 wherein, each said stop member is sufficiently resilient to enable bias between said first stable position and said second stable position.

23. A vertically foldable frame for a lightweight wheelchair comprising:

a pair of side frame assemblies connected together as a unit by at least one cross-frame member, at least one of said side frame assemblies providing a bi-stable, over-center, four-bar said linkage assembly movable between and biased toward both of:

(i) a first stable position on one side of a linkage assembly centerline when said one side frame assembly is in a vertically extended deployed condition; and (ii) a second stable position on an opposite side of said centerline when said one side frame assembly is in a relatively vertically compact collapsed condition, said four-bar linkage assembly including:

an upper frame member;

a front frame member having an upper end pivotally coupled proximate a front end of the upper frame member and depending downwardly therefrom;

a bottom frame member having a longitudinal axis, and a forward end pivotally coupled to said front frame member at a position therealong and spaced-apart from the front frame upper end thereof; and an L-shaped hinge bracket having one end pivotally mounted to a rear end of said upper frame member, and an opposite end thereof pivotally coupled proximate a rearward end of said bottom frame member, said hinge bracket extending along a longitudinal axis spaced-apart from the pivotal coupling at said one end, and extending in a direction substantially passing through said opposite end thereof such that said linkage assembly centerline occurs between said deployed condition and said collapsed position when the hinge bracket longitudinal axis and the bottom frame longitudinal axis extend in substantially the same direction.

24. The vertical foldable frame as defined in claim 23 wherein, said linkage assembly includes a linkage locking mechanism releasably locking said hinge bracket to said upper frame member when said frame members are situated in said deployed condition.

25. The vertical foldable frame as defined in claim 24 wherein, said locking mechanism includes a side plate member fixedly mounted to said upper frame member proximate said rear end thereof, and defining a hinge pin aperture positioned to co-axially align with a hinge pin hole in said hinge bracket when said frame members are situated in said deployed condition, said hinge pin aperture and said hinge pin hole formed for receipt of a hinge pin upon co-axial alignment therebetween.

26. The vertical foldable frame as defined in claim 23 wherein, said linkage assembly includes a stop member operably coupled between the pivotal coupling between said upper frame member and said front frame member to limit the pivotal movement therebetween in said deployed condition.

27. The vertical foldable frame as defined in claim 26 wherein, said stop member is sufficiently resilient to enable bias between said first stable position and said second stable position.

28. A vertically foldable frame for a lightweight wheelchair comprising:

a pair of side frame assemblies connected together as a unit by at least one cross-frame member:

said side frame assemblies each having frame members coupled together for selective movement of said side frame assemblies between a vertically extended deployed condition and a relatively vertically compact collapsed condition; and at least one of said side frame assemblies having frame members coupled together to provide a bi-stable, over-center, linkage assembly movable between and biased toward both of:

(i) a first stable position on one side of a linkage assembly centerline when said side frame assemblies are in said deployed condition; and (ii) a second stable position on an opposite side of said centerline when said side frame assemblies are in said collapsed condition, said frame members of the one side frame assembly being formed and dimensioned for sufficient resiliency and tension, when positioned substantially proximate said centerline, to bias the linkage assembly toward said first stable positioned when on the one side of the centerline, and toward said second stable positioned when said linkage assembly is positioned on the opposite side of the centerline.

29. A vertically foldable frame for a lightweight wheelchair comprising:

a pair of side frame assemblies connected together as a unit by at least one cross-frame member;

said side frame assemblies each having frame members coupled together for selective movement of said side frame assemblies between a vertically extended deployed condition and a relatively vertically compact collapsed condition;

at least one of said side frame assemblies having frame members pivotally coupled together to provide a bi-stable, over-center, linkage assembly movable between and biased toward both of:

(i) a first stable position on one side of a linkage assembly centerline when said side frame assemblies are in said deployed condition; and (ii) a second stable position on an opposite side of said centerline when said side frame assemblies are in said collapsed condition; and a resilient stop member cooperating with a pivotal coupling between said frame members of the one side frame assembly to limit the pivotal movement therebetween in the deployed condition, said resilient stop member further being sufficiently formed and dimensioned for compression between said frame members, when said linkage assembly is positioned substantially proximate said centerline, for biasing toward said first stable positioned when on the one side of the centerline, and toward said second stable positioned when said linkage assembly is positioned on the opposite side of the centerline.

* * * * *